United States Patent
Yamamoto

[11] Patent Number: 5,859,816
[45] Date of Patent: Jan. 12, 1999

[54] TRACKING ERROR SIGNAL GENERATING CIRCUIT

[75] Inventor: Takeshi Yamamoto, Tokyo, Japan

[73] Assignee: Kabushiki Kaisha Toshiba, Kawaskai, Japan

[21] Appl. No.: 837,854

[22] Filed: Apr. 22, 1997

[30] Foreign Application Priority Data

Apr. 22, 1996 [JP] Japan .................................. 8-099968

[51] Int. Cl.$^6$ ...................................................... G11B 7/00
[52] U.S. Cl. ...................................... 369/44.25; 369/44.34
[58] Field of Search .................................. 369/32, 44.34, 369/44.35, 44.25, 44.41, 44.42, 124

[56] References Cited

FOREIGN PATENT DOCUMENTS

| 138 277 | 4/1985 | European Pat. Off. . |
| 197 666 | 10/1986 | European Pat. Off. . |
| 0238162 | 9/1987 | European Pat. Off. . |
| 238 162 | 9/1987 | European Pat. Off. . |
| 6101663 | 7/1993 | Japan . |

OTHER PUBLICATIONS

Patent Abstracts of Japan, Mar. 1992 re JP 04/067324.
Patent Abstracts of Japan, Apr. 1990 re JP 02/108244.
Patent Abstracts of Japan, Aug. 1986 re JP 61/188746.

*Primary Examiner*—Nabil Hindi
*Attorney, Agent, or Firm*—Pillsbury Madison & Sutro LLP

[57] ABSTRACT

A tracking control system for use in a digital video disc (DVD) system requires generation of a precise error tracking signal. A tracking control system has an optical detector for reading a light beam reflected from a light beam spot radiated on a recording medium. Errors in tracking are detected and controlled by a tracking error signal generated in part through pulse shaping circuits controlled by a differential amplifier. Phase difference pulses generated by the pulse shaping circuits are free from noise impulses and other anomalies which could affect accurate tracking. The differential amplifier enables regulation of a phase difference offset and eliminate noise impulses while still maintaining the frequency characteristics necessary for high density recording mediums.

8 Claims, 6 Drawing Sheets

TRACKING ERROR SIGNAL GENERATING CIRCUIT

FIELD OF THE INVENTION

The present invention generally relates to a tracking error signal generating circuit, and more particularly, to a circuit which generates a tracking servo signal in an apparatus for reproducing information on a recorded medium.

BACKGROUND OF THE INVENTION

Recently, an apparatus for reproducing an optical disc containing digitally recorded image compressed video signals, digital information handled in personal computers, and other digitally stored information (hereinafter referred to as DVD (Digital Video Disc)) was proposed and is approaching commercial application. DVD is capable of recording movies exceeding two hours on a single surface of a disc having the same 12 cm diameter as a high density compact disc. To accurately reproduce information from such a recording medium, an accurate and precise tracking servo is needed. For accurate and precise tracking at the level that DVD requires, it becomes important to generate an extremely precise tracking error signal, one that is even more precise than that used in tracking conventional CD's.

The DVD standard explains that a tracking error signal can be determined from a laser beam spot reflected from the disk. The reflected light spot is detected with a 4-division photo detector. By adding together the outputs obtained from diagonally located divisions in the photo detector, a tracking error can be determined according to a phase difference between those signals. This is based on the principle that a phase difference is produced between the added signals in the diagonal divisions by a tracking error in a phase difference tracking error generation process.

A general phase difference tracking error servo system is shown in FIG. 6. A 4-division photo detector 101 is attached to an optical pickup. The outputs in the diagonally located divisions of the photo detector 101 are added by adders 102 and 103. These signals are shaped into pulses by waveform shapers 106 and 107, compared with each other by a phase comparator 108 and converted into signals corresponding to a phase difference. However, in the case of signals having an extremely high recording density such as in DVD, input signals are subject to the effects of interference from adjacent tracks and various internal and external noises. If so affected, the input signals are not shaped into uniformly shaped square waves between the outputs in the comparators 106 and 107, and a large amplitude noise impulse may be present immediately before the pulses or the pulses may become a lower amplitude wave on one side only. In particular, a phase comparator 108 at the later stage generates a trapezoidal wave phase difference characteristic by reversing the output polarity and by digitally discriminating the advance/delay between two input pulses.

Accordingly, a large output error may be generated by misreading the phase relationship between the pulses if there are abnormal pulses as described above. If such abnormal pulses are generated frequently, accurate tracking operation cannot be expected. Most abnormal operations are caused by pulses having a narrow width, such as the noise impulses described above. To eliminate these narrow pulses, low-pass filters 104 and 105 are inserted before the comparators 106 and 107, respectively.

The output of the phase comparator 108 is a phase error signal which passes through a buffer 109. After the phase error signal is processed in a control circuit 110, the phase error signal controls a driving circuit 111. This driving circuit 111 controls the tracking to the center by moving the spot position of the laser beam forward with respect to the center of the photo detector 101. Thus, the tracking servo signal provides closed loop control to make the phase error zero.

However, a DVD is sensitive to fluctuations in the positional relationship and the sensitivity between the segments of the 4-division photo detector because a DVD has a much higher recording density than a conventional optical disc such as a CD, etc. Further, a DVD is affected delicately by the shapes of pits, lands, and grooves. These physical fluctuation factors appear as a phase error of a pickup output signal for the tracking servo. This phase error is caused by a circuit imbalance and directly causes a tracking error, deteriorating the tracking performance. This circuit imbalance needs to be adjusted to make the circuits equal and to correct the phase error. Thus, in a phase difference type tracking servo, careful advance calibration is needed to eliminate this tracking error.

For tracking optical discs, such as conventional CD's, using the phase difference type tracking servo illustrated in FIG. 6, variable resistors were once used for constructing the low-pass filters 104 and 105. By making the low-pass filters 104 and 105 unbalanced by changing the resistance of either one of these resistors, an originally retained phase difference offset is canceled by a phase offset generated between the low-pass filters 104 and 105.

However, such a method cannot generate a signal having a sufficient amplitude to reverse the comparator in a high frequency region because the amplitude characteristic begins to attenuate before a phase difference offset required for compensation is obtained. The phase difference tracking error signal uses the whole region of the RF signal. Therefore, if the amplitude characteristic is attenuated in the high frequency band, an accurate error signal cannot be generated. The cut-off frequency of a low-pass filter could be set at a high level to limit the regulating range and avoid affecting the amplitude characteristic; however, by doing so, the phase difference offset required for compensation would not be obtained and the noise impulses would not be eliminated.

Although this method was sufficient for tracking CD's having low recording density, the recording density of DVD's is too high for conventional tracking methods to be effective. For DVD tracking, a wide band frequency characteristic is required to generate an accurate phase difference error. Further, a wider phase difference regulating range and more reliable noise impulse elimination is required for DVD tracking due to the higher recording density. However, there is no conventional circuit which can provide the combination of a wide band frequency characteristic, a wide phase difference regulating range, and reliable noise impulse elimination without compromising the performance of at least one of these three objectives.

As described above, it was not feasible to generate a tracking error signal for DVD using a conventional phase difference tracking error generating circuit due to DVD's high recording density. Conventional tracking error generating circuits were unable to regulate sufficiently the phase difference offset and eliminate noise impulses with certainty while maintaining the frequency characteristic necessary for accurate phase error generation in a DVD tracking system.

SUMMARY OF THE INVENTION

It is therefore, an object of the present invention to provide a tracking error signal generating circuit capable of simultaneously providing the wide frequency band, the wide regulating range and the excellent noise eliminating performance demanded in DVD tracking with no deterioration or compromise in any aspect of the tracking system's performance.

In order to achieve the above object, a tracking error signal generating circuit according to one embodiment of the present invention is a tracking control system for an optical information reproducing apparatus. The reproducing apparatus radiates a light beam spot to a medium having recorded information, and the light reflected therefrom is detected by an optical detector having plural outputs. The plural outputs are added/subtracted in any combination to generate two signals. A phase comparator extracts a phase difference component between these two signals as a tracking error signal. The relative positional relationship between the reflected light of the light beam spot and the optical detector is controlled by this tracking error signal. These two outputs are binarized by first and second pulse shaping circuits, each of which contains an integrating circuit and a comparator, and a control circuit is provided to relatively change integral slopes of the integrating circuits in the first and second pulse shaping circuits.

In a tracking error generating circuit according to the invention, it is possible to obtain sufficient phase difference offset regulation and noise impulse elimination while maintaining the frequency characteristic required for phase error generation by executing the phase offset correction and noise impulse elimination simultaneously according to a difference between time constants generated by different integral slopes using the integrating circuit. This allows generation of a tracking error signal which is not dependent on the amplitude characteristics of any signal.

Further, a tracking error signal generating circuit of a second embodiment of the present invention is a tracking control system of an optical information reproducing apparatus. The reproducing apparatus radiates a light beam spot onto a medium containing recorded information. The light reflected therefrom is detected by an optical detector having plural outputs. The plural outputs are added/subtracted in any combination to generate two signals. A phase comparator phase difference component between the two signals is extracted as a tracking error signal, and the relative positional relationship between the reflected light of the light beam spot and the optical detector is controlled by this tracking error signal. Two outputs from the adding/subtracting circuits are binarized via phase-shifting delay circuits having variable delay amounts. The two outputs from the adding/subtracting circuits are phase-compared. A delay time control circuit is provided to relatively change the delay times of the phase-shifting delay circuits.

In a tracking error generating circuit according to this embodiment, it is possible to obtain sufficient phase difference offset regulation and reliable noise impulse pulse elimination while maintaining the frequency characteristic required for phase error generation because the phase offset volume is adjusted using a phase-shifting delay circuit at the later stage of an adder. This allows generation of a tracking error signal which is not dependent on the amplitude characteristics of any signal.

Further, a tracking error signal generating circuit of a third embodiment of the present invention is a tracking control system for an optical information reproducing apparatus. The apparatus radiates a light beam spot onto a medium having recorded information. The light reflected therefrom is detected by an optical detector having plural outputs. The plural outputs are added/subtracted in any combination to generate two signals. A phase comparator extracts a phase difference component between these two signals as a tracking error signal, and the relative positional relationship between the reflected light of the light beam spot and the optical detector is controlled by this tracking error signal. Plural outputs from the optical detector are delayed by phase-shifting delay circuits having variable delay amounts. The outputs of the optical detector are phase-compared after being binarized by pulse shaping circuits. A delay time control circuit is provided to control the delay times of signals transmitted to the pulse shaping circuits.

In this tracking error generating circuit, it is possible to obtain sufficient phase difference offset regulation and reliable noise impulse elimination while maintaining the frequency characteristic required for phase error generation. This is accomplished by regulating the phase offset volume using a phase-shifting delay circuit for all pickup outputs at the former stage of an adder.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
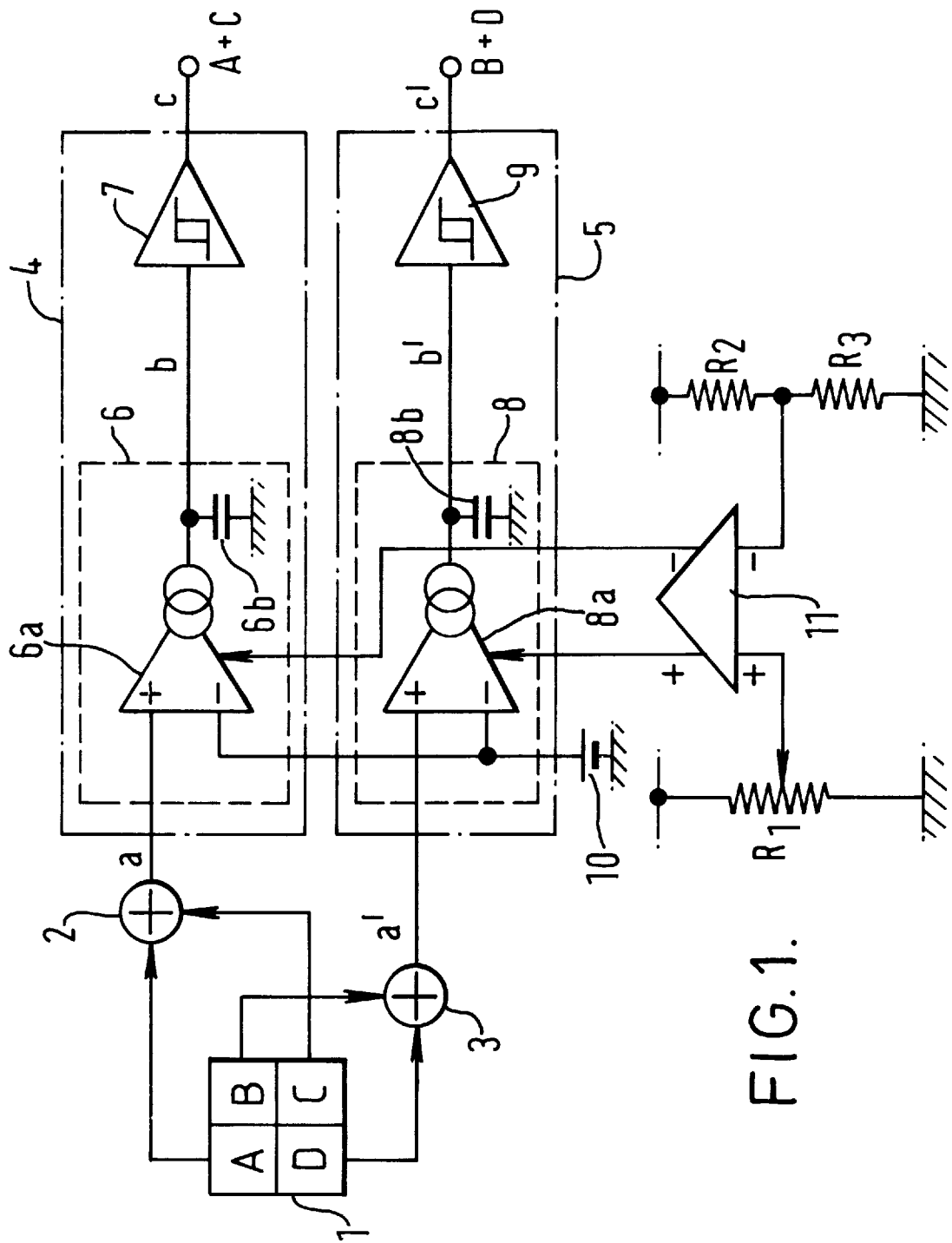
FIG. 1 is a circuit diagram explaining a first embodiment of the present invention.

The present invention will be described in detail with reference to FIGS. 1 through 5. A first embodiment of the present invention is described referring to a circuit diagram shown in FIG. 1. This embodiment is an improved phase difference signal generating circuit and is meant to replace the conventional phase difference tracking servo system shown within the boxed portion of FIG. 6.

Outputs A–D of diagonally positioned divisions in a 4-division optical detector 1 are added by adders 2 and 3 and input to separate pulse shaping circuits 4 and 5, respectively. The pulse shaping circuit 4 is composed of an integrating circuit 6, containing a transconductance amplifier 6a and a capacitor 6b, and a comparator 7. The pulse shaping circuit 5 is composed of an integrating circuit 8, containing a transconductance amplifier 8a and a capacitor 8b, and a comparator 9. The input signal levels on non-inverting input terminals of the transconductance amplifiers 6a, 8a are compared with an input of a reference voltage 10 on the inverting input terminals, and a constant current is output according to the size of the voltage.

If the output a of the adder 2 is higher than the reference voltage 10, the transconductance amplifier 6a forces a constant current to flow out to the output a. Conversely, if the output a of the adder 2 is lower than the reference voltage 10, a constant current flows thereinto from the output a. Similarly, with respect to the transconductance amplifier 8a, if the output a' of the adder 3 is higher or lower than the reference voltage 10, a constant current flows out to or is drawn from the output a. The reference voltage 10 is provided in advance by filtering the a or a' signal through the low-pass filter at the mean potential of the signal. A trapezoidal waveform appears at the outputs b and b' of the integrating circuits 6 and 8. The trapezoidal waveform rises and saturates at a prescribed upper limit value if the input voltage is higher than the reference voltage 10 and falls and saturates at a prescribed lower limit value if input voltage is lower than the reference voltage 10. The output currents of the transconductance amplifiers 6a and 8a are controlled by a differential amplifier 11. By providing a regulating voltage at the non-inverting input terminal using a variable resistor R1 and comparing the regulating voltage with a constant voltage which is input to the inverting input terminal using resistors R2 and R3, the distribution of the current output values of the transconductance amplifiers 6a and 8a can be changed.

The relative slopes of the integrated waveforms are thus changed by controlling signals as described above. Phase difference pulses c and c' are produced by slicing these waveforms at a certain level using comparators 7 and 9.

Figure 2:
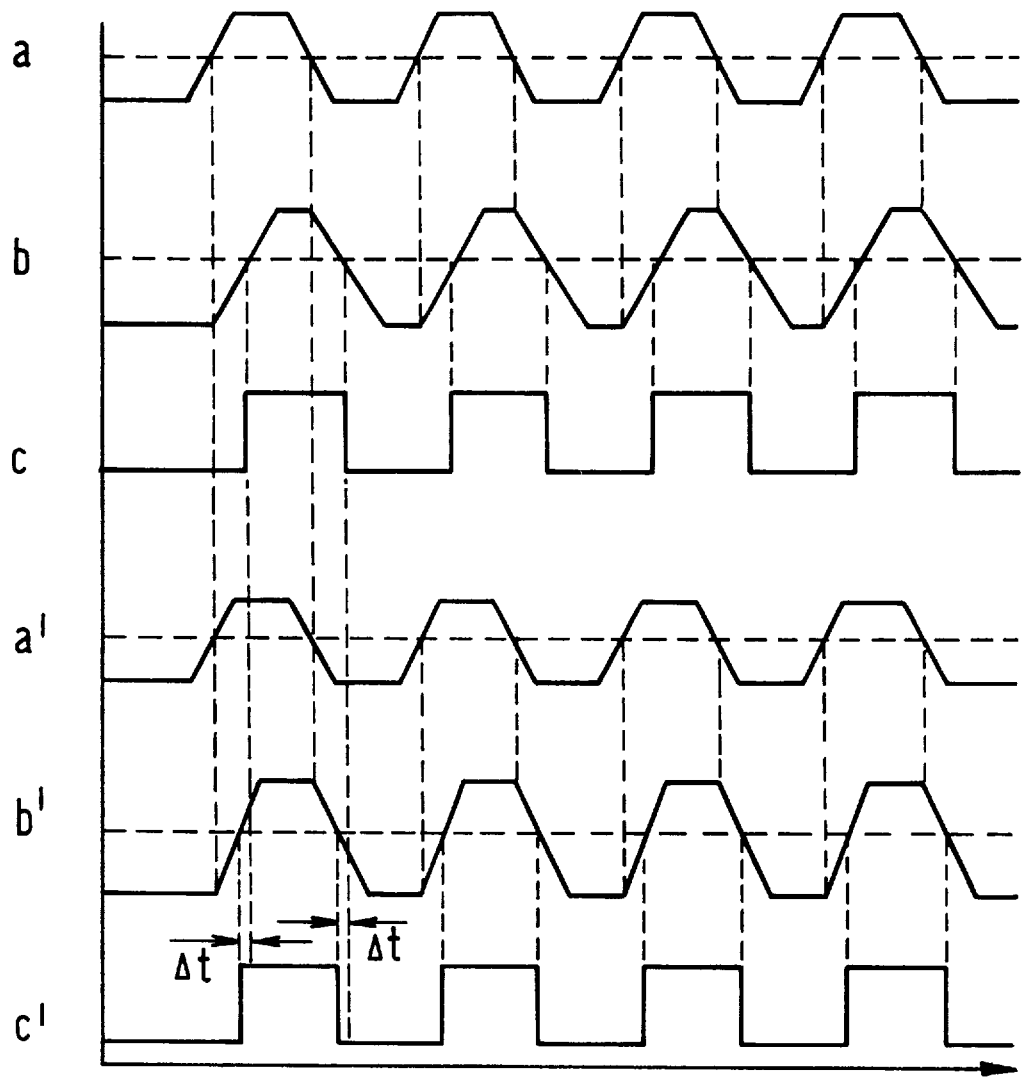
FIG. 2 is a signal waveform diagram illustrating the operation of the circuit shown in FIG. 1.

Signal waveforms at particular sections of the invention are shown in FIG. 2. The phase difference offset is regulated by the voltage at the non-inverting input terminal of the differential amplifier 11. For instance, if the variable resistor R1 is regulated so that input voltage becomes high, the output current of the transconductance amplifier 6a decreases and the slope of the output b becomes gentle, and the output current of the transconductance amplifier 8a increases and the slope of the output b' becomes steep. The relationship between the phases of pulses c and c' which are output via the comparators 7 and 9 will become such that the phase of c delays and the phase of c' advances. Conversely, if the variable resistor R1 is regulated so that the voltage on the inverting input terminal of the differential amplifier 11 decreases, the phase of c advances and the phase of c' delays. Thus, it is possible to change the relative phase difference between the output pulses c and c' by changing the value of the variable resistor R1.

In this embodiment, the inputs of the transconductance amplifiers 6a, 8a change between levels and are already converted into pulses in the current outputs. Therefore, the output current does not depend on the input amplitude. In practice, the output current does depend somewhat on the input amplitude since the gain is limited, but its degree of dependence is minimal. The phase difference offset (time difference) to be regulated is determined using the output currents from the transconductance amplifiers 6a, 8a, but the output currents are determined by regulating the voltage of the differential amplifier 11 and has virtually no relationship with input signal amplitude. That is, it is possible to regulate the phase difference offset independently without influence from the amplitude characteristics of the input signal.

The integrating circuits 6, 8 serve to remove noise impulses. That is, there is a certain time difference between the time the input is reversed and the integration is started until the time the reference level is reached and the output is reversed. Accordingly, if a pulse is shorter than this time difference, the output cannot be reversed and no pulse can be produced for the output.

In this embodiment, noise impulses are disregarded and removed from the shaped pulses. It is clear that the pulse width of the noise impulse being removed does not depend on an input amplitude. Since the adjustment of the noise impulse removing function can be conducted independently of input signal amplitude, malfunctions due to noise can be reduced greatly.

Figure 3:
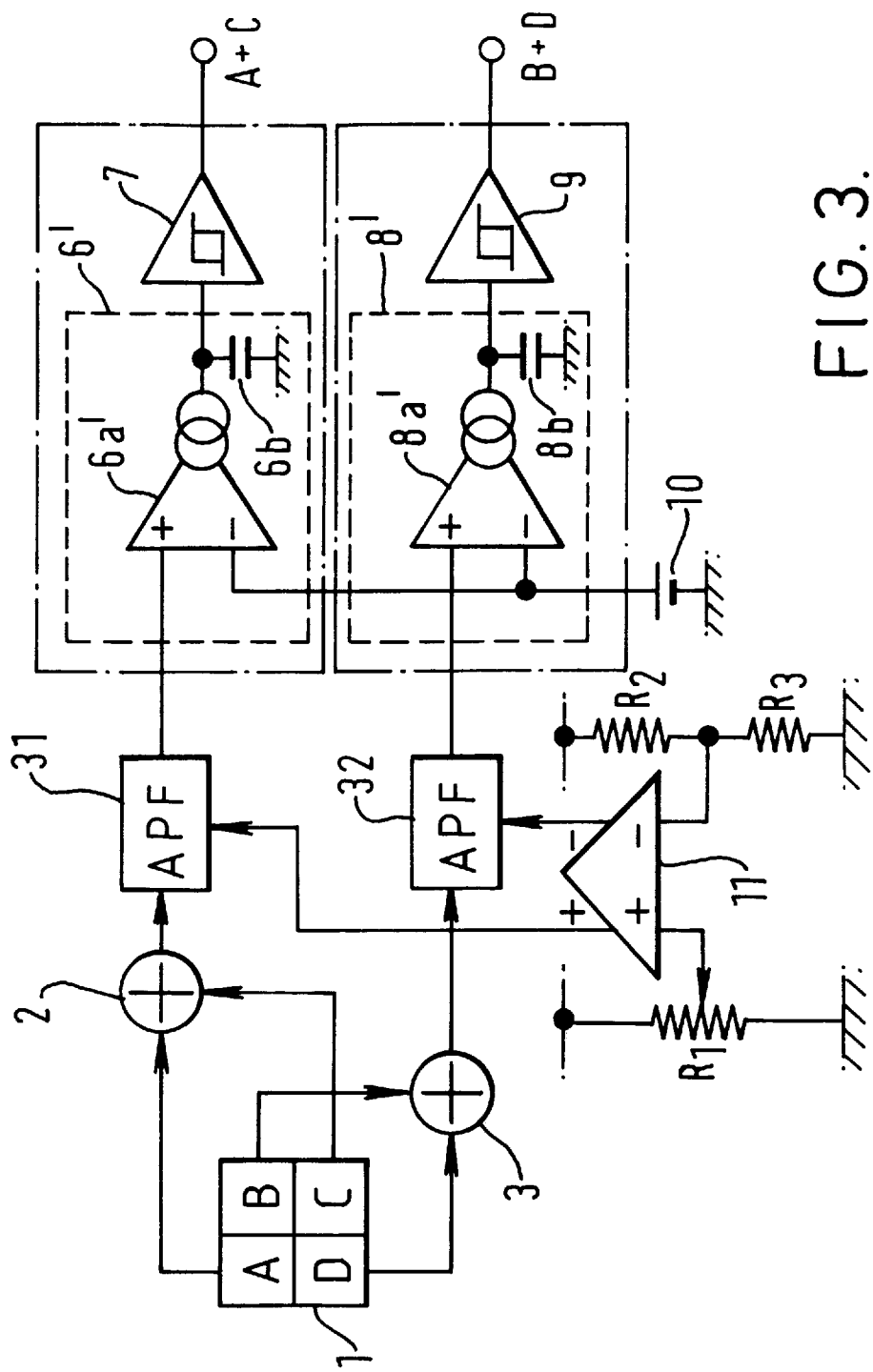
FIG. 3 is a circuit diagram illustrating a second embodiment of the present invention.

FIG. 3 is a circuit diagram explaining a second embodiment of the present invention. This embodiment differs from the embodiment shown in FIG. 1 in that transconductance amplifiers 6a', 8a', whose output current values are fixed, are used in place of the transconductance amplifiers 6a, 8a of FIG. 1, and phase-shifting delay circuits (APF) 31 and 32 are inserted between the adder 2 and the integrator circuit 6' and the adder 3 and the integrator circuit 8', respectively. The same component elements as those shown in FIG. 1 will be explained by assigning the same reference numerals.

Figure 4:
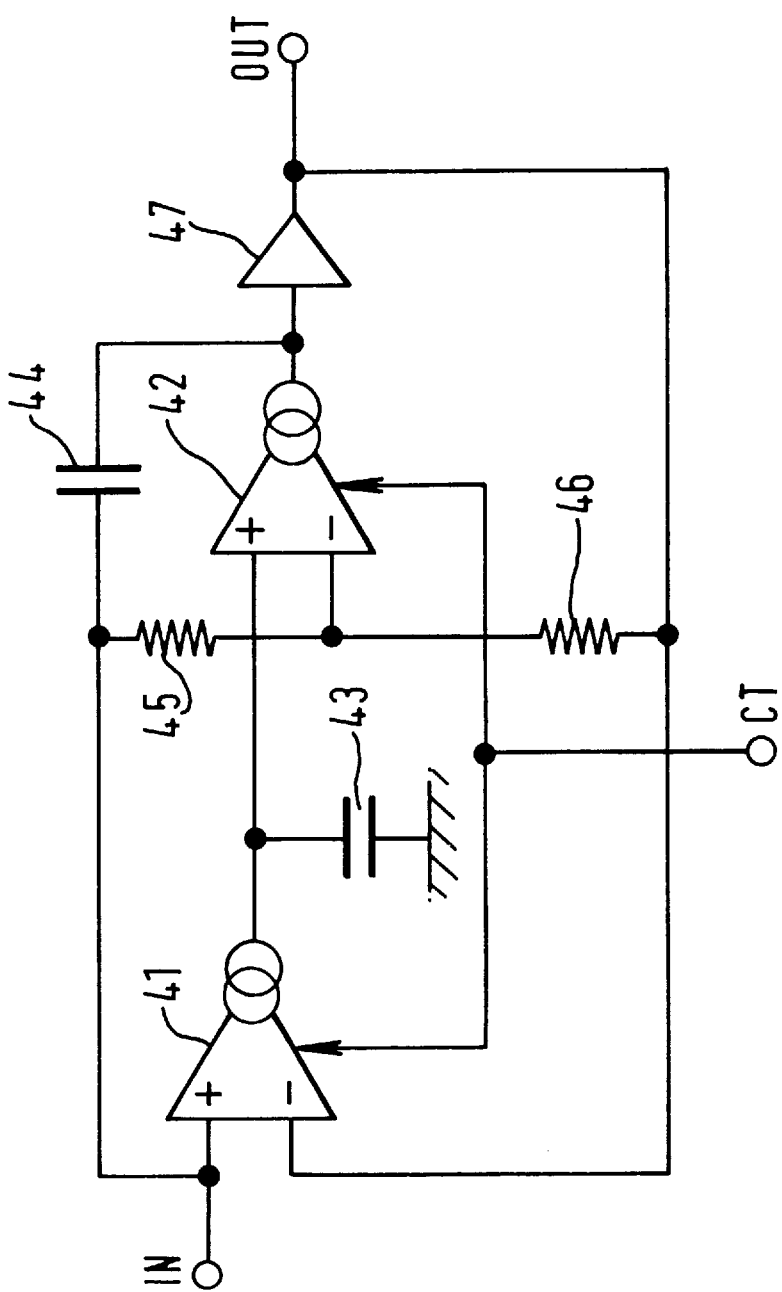
FIG. 4 is a circuit diagram illustrating a phase-shifting circuit used in the circuit shown in FIG. 3.

The APFs 31 and 32 are circuits which each have a flat amplitude characteristic and a nearly constant delay time when the APF is used in an integrating circuit. FIG. 4 shows one example of such a circuit. If resistors 45 and 46 are made equal to each other in this circuit, it becomes a phase-shifting delay circuit. A delay time between the input and output can be controlled by proportionally controlling the transconductances of transconductance amplifiers 41 and 42 through a control terminal CT.

In the circuit shown in FIG. 3, the delay times of the APFs 31 and 32 are controlled by the differential amplifier 11. The differential amplifier 11 compares the reference voltages set by the resistors R2 and R3 with the regulating voltage set by the variable resistor R1 and changes the regulating current of the APFs 31 and 32 according to the regulating voltage.

As a result, the delay times of the signals which are output from the diagonal divisions of the optical detector and added together are changed to the reverse direction according to the regulating voltage. Thus, it is possible to relatively change a delay time difference between two outputs of the APFs 31, 32. Since the APFs 31, 32 have a flat amplitude characteristic, the amplitude of the input signal is never changed through the control of delay times. The signals delayed by the APFs 31, 32 are shaped into pulse waves by the integrating circuit 6' and the comparator 7 and by the integrating circuit 8' and the comparator 9, respectively. This portion of the circuit removes noise impulses in the same manner as the circuit of FIG. 1, which fixes the transconductance of the integrator.

In this embodiment, it is possible to set a removable pulse width because there is no amplitude characteristic in the APF 31 and 32. Furthermore, in addition to the features of the circuit shown in FIG. 1, there is an additional advantage that the delay time difference and the noise impulse removing function can be determined and adjusted independently.

Figure 5:
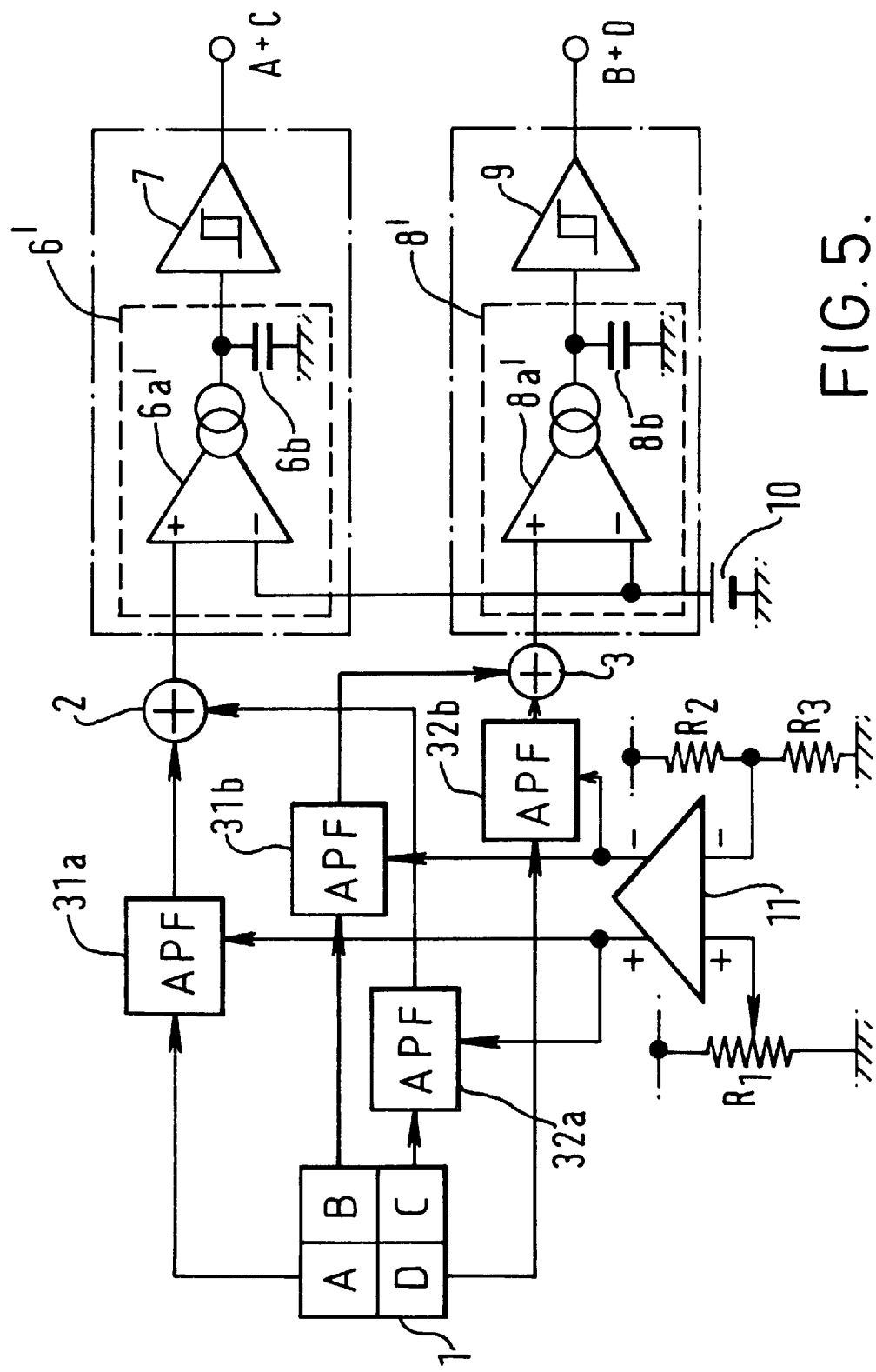
FIG. 5 is a circuit diagram for illustrating a third embodiment of the present invention.
Figure 6:
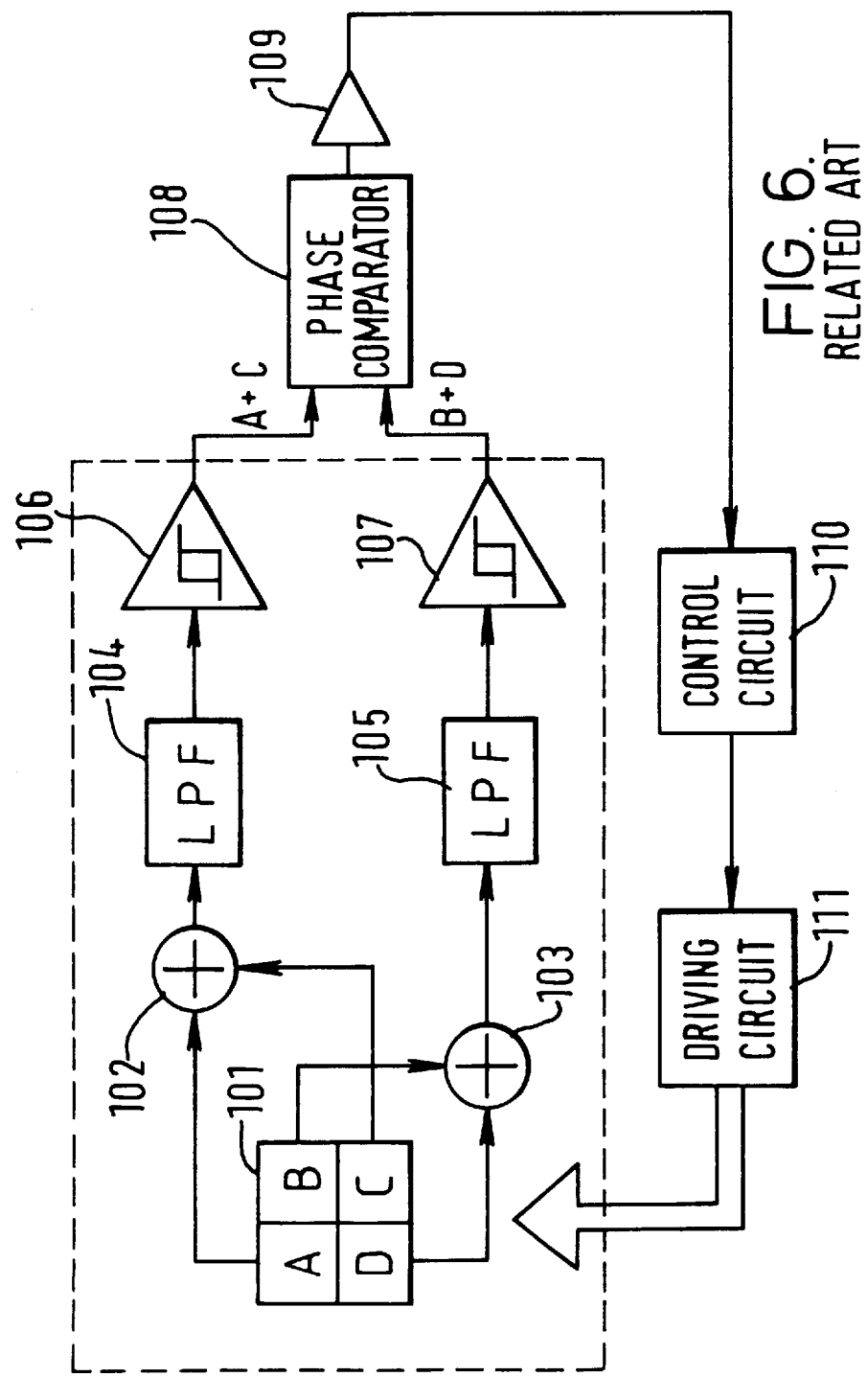
FIG. 6 is a system diagram illustrating a conventional phase differential tracking servo.

Next, a third embodiment of the present invention will be described with reference to FIG. 5. This embodiment differs from the embodiment shown in FIG. 3 in that the APFs are moved to a stage before the adders 2, 3 rather than after the adders.

In this case, an APF is required for each of the outputs A through D of the optical detector 1. To provide the same delay time regulating function as the circuit shown in FIG. 3, it is necessary to control APF 31a of the A output, APF 32a of the C output, APF 31b of the B output and APF 32b of the D output so that they all have the same delay time.

Thus, this embodiment functions in a similar as the embodiment shown in FIG. 3 and also has an additional advantage that a delay time difference and the noise impulse removing capability can be set regardless of the amplitude characteristics of the input signal.

As described above, according to the present invention, it is possible to provide a waveform shaping circuit which has excellent waveform reproducibility for tracking error signal regeneration. It is also possible to achieve a tracking servo system which is extremely accurate and has a minimal number of faulty operations caused by noise impulses.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the scopes of the following claimed inventions is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A tracking control system for an optical information reproducing apparatus, comprising:
   an optical detector for reading a light beam reflected from a light beam spot radiated on a recording medium, the optical detector having a plurality of outputs;
   an adder/subtractor for adding/subtracting the plurality of outputs and generating a plurality of adder/subtractor signals;
   first and second pulse shaping circuits each having an integrating circuit and a comparator and generating a plurality of phase difference pulses based on the adder/subtractor signals;
   a control circuit for relatively changing slopes of integrator output signals from the integrators in the first and the second pulse shaping circuits to control a pulse width of the phase difference pulses; and
   a phase comparator which extracts a phase difference component from the phase difference pulses as a tracking error signal and controls the relative positional relationship between the reflecting light of the light beam spot and the optical detector based on the tracking error signal.

2. A tracking control system as claimed in claim 1, wherein each integrator circuit in the first and second pulse shaping circuits has a capacitor connected at its output, the comparator is a current output comparator, and the slope of the integrator output signal is controlled by changing the output current through controlling the bias current of the comparator.

3. The tracking control system of claim 1, wherein the control circuit comprises a differential amplifier.

4. The tracking control system of claim 3, wherein the differential amplifier has a variable resistor for providing a variable regulating voltage to the first and second pulse shaping circuits such that variations in the regulating voltage change the slope of the integrator output signal.

5. A tracking control system for an optical information reproducing apparatus, comprising:
   an optical detector for reading a light beam reflected from a light beam spot radiated on a recording medium, the optical detector having a plurality of outputs;
   an adder/subtractor for adding or subtracting the plurality of outputs and generating a plurality of adder/subtractor signals;
   a plurality of variable phase-shifting delay circuits which generate at least one delay time and delay the output of the adder/subtractor signals from the variable phase-shifting delay circuits;
   a delay time control circuit coupled with the variable phase-shifting delay circuits to relatively change the delay times;
   a plurality of pulse-shaping circuits, each including an integrating circuit and a comparator, which generate phase difference pulses based on the adder/subtractor signals; and
   a phase comparator which extracts a phase difference component from the phase difference pulses as a tracking error signal and controls the relative positional relationship between the reflecting light of the light beam spot and the optical detector based on the tracking error signal.

6. A tracking control system for an optical information reproducing apparatus, comprising:
   an optical detector for reading a light beam reflected from a light beam spot radiated on a recording medium, the optical detector having a plurality of outputs;
   an adder/subtractor for adding or subtracting the plurality of outputs and generating a plurality of adder/subtractor signals;
   a plurality of variable phase-shifting delay circuits which generate at least one delay time and delay the output of the adder/subtractor signals from the variable phase-shifting delay circuits;
   a delay time control circuit coupled with the variable phase-shifting delay circuits to relatively change the delay times;
   a plurality of pulse-shaping circuits, each including a low pass filter and a comparator, which generate phase difference pulses based on the adder/subtractor signals; and
   a phase comparator which extracts a phase difference component from the phase difference pulses as a tracking error signal and controls the relative positional relationship between the reflecting light of the light beam spot and the optical detector based on the tracking error signal.

7. A tracking control system for an optical information reproducing apparatus, comprising:
   an optical detector for reading a light beam reflected from a light beam spot radiated on a recording medium, the optical detector having a plurality of outputs;
   a plurality of variable phase-shifting delay circuits which generate at least one delay time and delay the outputs of the optical detector from being output from the variable phase-shifting delay circuits;
   a delay time control circuit coupled with the variable phase-shifting delay circuits to relatively change the delay times;

an adder/subtractor for adding or subtracting the plurality of outputs of the variable phase-shifting delay circuits and generating a plurality of adder/subtactor signals;

a plurality of pulse-shaping circuits, each including an integrating circuit and a comparator, which generate phase difference pulses based on the adder/subtractor signals; and a phase comparator which extracts a phase difference component from the phase difference pulses as a tracking error signal and controls the relative positional relationship between the reflecting light of the light beam spot and the optical detector based on the tracking error signal.

8. A tracking control system for an optical information reproducing apparatus, comprising:

an optical detector for reading a light beam reflected from a light beam spot radiated on a recording medium, the optical detector having a plurality of outputs;

a plurality of variable phase-shifting delay circuits which generate at least one delay time and delay the outputs of the optical detector from being output from the variable phase-shifting delay circuits;

a delay time control circuit coupled with the variable phase-shifting delay circuits to relatively change the delay times;

an adder/subtractor for adding or subtracting the plurality of outputs of the variable phase-shifting delay circuits and generating a plurality of adder/subtactor signals;

a plurality of pulse-shaping circuits, each including a low pass filter and a comparator, which generate phase difference pulses based on the adder/subtractor signals; and a phase comparator which extracts a phase difference component from the phase difference pulses as a tracking error signal and controls the relative positional relationship between the reflecting light of the light beam spot and the optical detector based on the tracking error signal.

\* \* \* \* \*

UNITED STATES PATENT AND TRADEMARK OFFICE
CERTIFICATE OF CORRECTION

PATENT NO. : 5,859,816

DATED : January 12, 1999

INVENTOR(S) : YAMAMOTO

It is certified that error appears in the above-identified patent and that said Letters Patent is hereby corrected as shown below:

Column 1, line 12, delete "an optical disc";

line 13, delete "containing";

line 14, after "signals" insert --contained in an optical discs--;

line 24, delete ", one";

line 26, change "explains" to --provides--.

UNITED STATES PATENT AND TRADEMARK OFFICE
CERTIFICATE OF CORRECTION

PATENT NO.    : 5,859,816
DATED         : January 12, 1999
INVENTOR(S)   : YAMAMOTO It is certified that error appears in the above-identified patent and that said Letters Patent is hereby corrected as shown below:

Column 2, line 11, change "Further" to --Furthermore--; and after "is" insert --delicate and is--; and delete "delicately";

line 13, change "of" to --in--;

line 15, delete "," and after "error" insert --which--;

line 16, change "deteriorating the" to --deteriorates--;

line 21, after "tracking" insert --conventional--; and delete ", such as conventional CD's,";

line 23, delete "once";

line 67, delete "therefore,".

Column 3, line 4, delete "any aspect of";

line 11, change ", and the" to --. The--;

line 20, change "," to --.--;

line 21, change "and a" to --A--;

line 40, change "/" to -- or --;

Column 4, line 33, change "explaining" to --illustrating--;

Column 5, line 9, change "a." to --a', respectively--;

line 36, change "becomes gentle" to --decreases--;

line 38, change "becomes steep" to --increases--;

UNITED STATES PATENT AND TRADEMARK OFFICE
CERTIFICATE OF CORRECTION

PATENT NO. : 5,859,816
DATED : January 12, 1999
INVENTOR(S) : YAMAMOTO

It is certified that error appears in the above-identified patent and that said Letters Patent is hereby corrected as shown below:

Column 5, line 58, change "with" to --to--;

line 59, change "influence" to --dependence--;

line 60, change "from" to --on--;

line 61, change "," to --and--; and after "8" insert --also--;

line 62, change "That is, there is a" to --A--; and after "difference" insert --exists--;

line 63, change "the time the input is reversed and the integration is started" to --reversing the input and starting the integration and--;

line 64, after "until" insert --reaching--; delete "time the"; delete "is reached"; and after "and" insert ---reversing--; and line 65, delete "is reversed".

Column 6, line 6, change "malfunctions" to --errors--;

line 11, change "are" to --replace--;

line 12, delete "used in place of";

line 18, delete "are circuits which"

line 36, delete "to" and after "relatively" insert --to--.

UNITED STATES PATENT AND TRADEMARK OFFICE
CERTIFICATE OF CORRECTION

PATENT NO.    : 5,859,816
DATED         : January 12, 1999
INVENTOR(S)   : YAMAMOTO It is certified that error appears in the above-identified patent and that said Letters Patent is hereby corrected as shown below:

Column 7, line 9, change "there" to --the preferred embodiments of the present invention --; delete "what are";

line 10, delete the entire line; and line 11, delete "present invention".

Signed and Sealed this

Thirtieth Day of November, 1999

Attest:

Q. TODD DICKINSON

*Attesting Officer*      *Acting Commissioner of Patents and Trademarks*